United States Patent
Umemura et al.

(10) Patent No.: US 6,841,966 B2
(45) Date of Patent: Jan. 11, 2005

(54) DRIVING CONTROL DEVICE OF A MOTOR

(75) Inventors: Chiaki Umemura, Kariya (JP); Yoshihide Suzuki, Kariya (JP); Xiaoou Ma, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 319 days.

(21) Appl. No.: 10/100,020

(22) Filed: Mar. 19, 2002

(65) Prior Publication Data

US 2002/0149338 A1 Oct. 17, 2002

(30) Foreign Application Priority Data

Mar. 19, 2001 (JP) ........................................ 2001-078360

(51) Int. Cl.[7] .............................................. H02P 7/36
(52) U.S. Cl. ...................... 318/701; 318/254; 318/138; 318/439; 318/432; 318/434
(58) Field of Search ............................... 318/701, 254, 318/138, 439, 432, 434, 433

(56) References Cited

U.S. PATENT DOCUMENTS

| | | | |
|---|---|---|---|
| 5,281,903 A | * | 1/1994 | Oku et al. .................. 318/701 |
| 5,589,752 A | * | 12/1996 | Iwasaki et al. ............. 318/701 |
| 6,100,660 A | * | 8/2000 | Ikeyama et al. ............ 318/473 |
| 6,380,705 B1 | * | 4/2002 | Inagaki et al. ............. 318/293 |

FOREIGN PATENT DOCUMENTS

| | | |
|---|---|---|
| JP | 2000-116183 A | 4/2000 |
| JP | 2000-166292 A | 6/2000 |

* cited by examiner

*Primary Examiner*—Rina I. Duda
(74) *Attorney, Agent, or Firm*—Sughrue Mion, PLLC (57) ABSTRACT

A driving control device of a motor includes a phase current control device for controlling a phase current which is fed to a phase coil of each phases of a motor in a predetermined control period of each phase coils so as to become a predetermined target current, respectively, a convergent control device for converging the phase current after the end of the control period of each phase coils and a driving signal generating device for generating a driving signal which controls the end timing of the phase current convergent control by the convergent control device so that the phase current convergent control is ended between a timing at which a reverse torque is generated by the phase current and the end timing of the control period for next phase coil.

3 Claims, 6 Drawing Sheets

DRIVING CONTROL DEVICE OF A MOTOR

CROSS REFERENCE TO RELATED APPLICATIONS

This application is based on and claims priority under 35 U.S.C. □~119 with respect to a Japanese Patent Application 2001-078360, filed on Mar. 19, 2001, the entire content of which is incorporated herein by reference.

FIELD OF THE INVENTION

The present invention relates to a driving control device of a motor, and more particularly to a driving control device of a motor which can reduce the objectionable acoustic noise.

BACKGROUND OF THE INVENTION

Recently, a switched reluctance motor (hereinafter, SR motor) is applied to a motor for driving a vehicle. The driving of the SR motor is controlled by a controller for feeding electricity including a CPU so as to maintain a target driving speed and a target driving torque. The controller for feeding electricity calculates the target driving speed and the target driving torque on the basis of signals from a shift lever, a brake switch, an accelerator switch and an accelerator opening amount sensor. The controller for feeding electricity outputs a driving control signal to a switching driving circuit on the basis of the result of the calculation and ON/OFF of energization of phase coil of each phases of the SR motor is controlled by the switching driving circuit. Thereby, the driving of the SR motor is controlled so as to maintain the target driving speed and the target driving torque.

Figure 6:
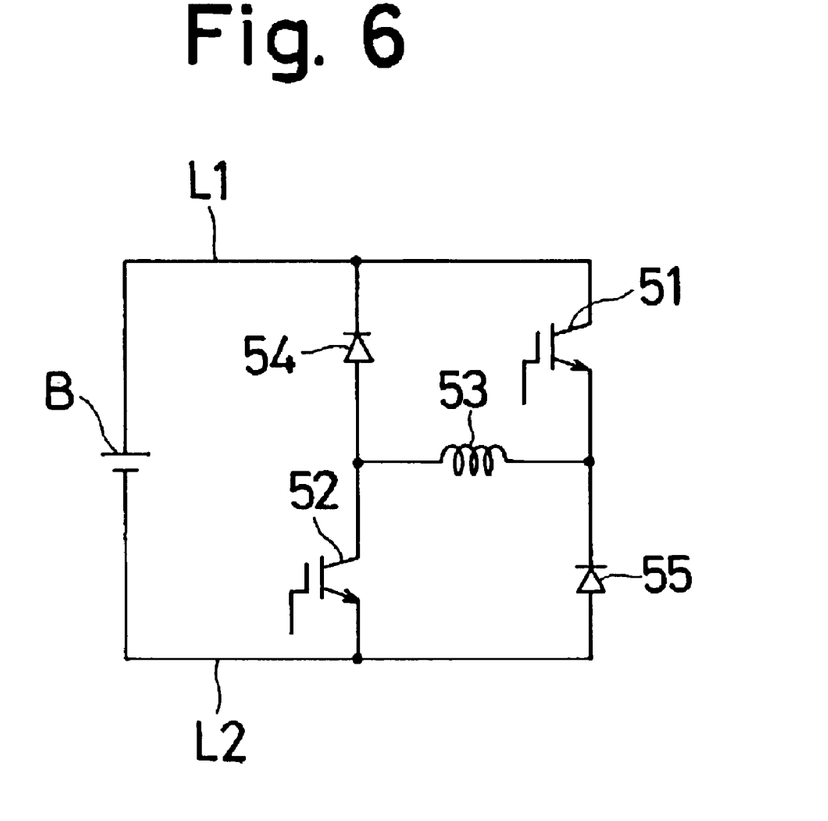
FIG. 6 is a diagram showing the switching driving circuit for controlling the electricity fed to the phase coil of each phase of the motor.

FIG. 6 shows an electric circuit for explaining an embodiment of the switching driving circuit which controls ON/OFF of energization of phase coil of each phases of the SR motor on the basis of the driving control signal from the controller for feeding electricity. In FIG. 6, for convenience, a driving circuit for one phase coil is shown.

In FIG. 6, the driving circuit includes, a high electric potential side switching transistor (hereinafter, high electric potential side transistor) 51, a low electric potential side switching transistor (hereinafter, low electric potential side transistor) 52. A collector terminal of the high electric potential side transistor 51 is connected to a plus electric terminal of a battery B via a high electric potential line L1. An emitter terminal of the low electric potential transistor 52 is connected to a minus terminal of the battery B via a low electric potential line L2. A phase coil 53 is connected between an emitter terminal of the high electric potential side transistor 51 and a collector terminal of the low electric potential side transistor 52.

The driving circuit further includes a high electric potential side flywheel diode (hereinafter, high electric potential side diode) 54 and a low electric potential side flywheel diode (hereinafter, low electric potential side diode) 55. The high electric potential side diode 54 is connected between the high electric potential line L1 and the collector terminal of the low electric potential side transistor 52. The low electric potential side diode 55 is connected between the low electric potential line L2 and the emitter terminal of the high electric potential side transistor 51.

The ON/OFF of the high electric potential side transistor 51 and the low electric potential side transistor 52 are controlled with a predetermined chopping frequency in a predetermined control period T, respectively. Thereby, a phase current I feeding to the phase coil 53 of each phases is controlled every control period T and the driving speed and the driving torque of the SR motor are controlled so as to be the target values.

Figure 5:
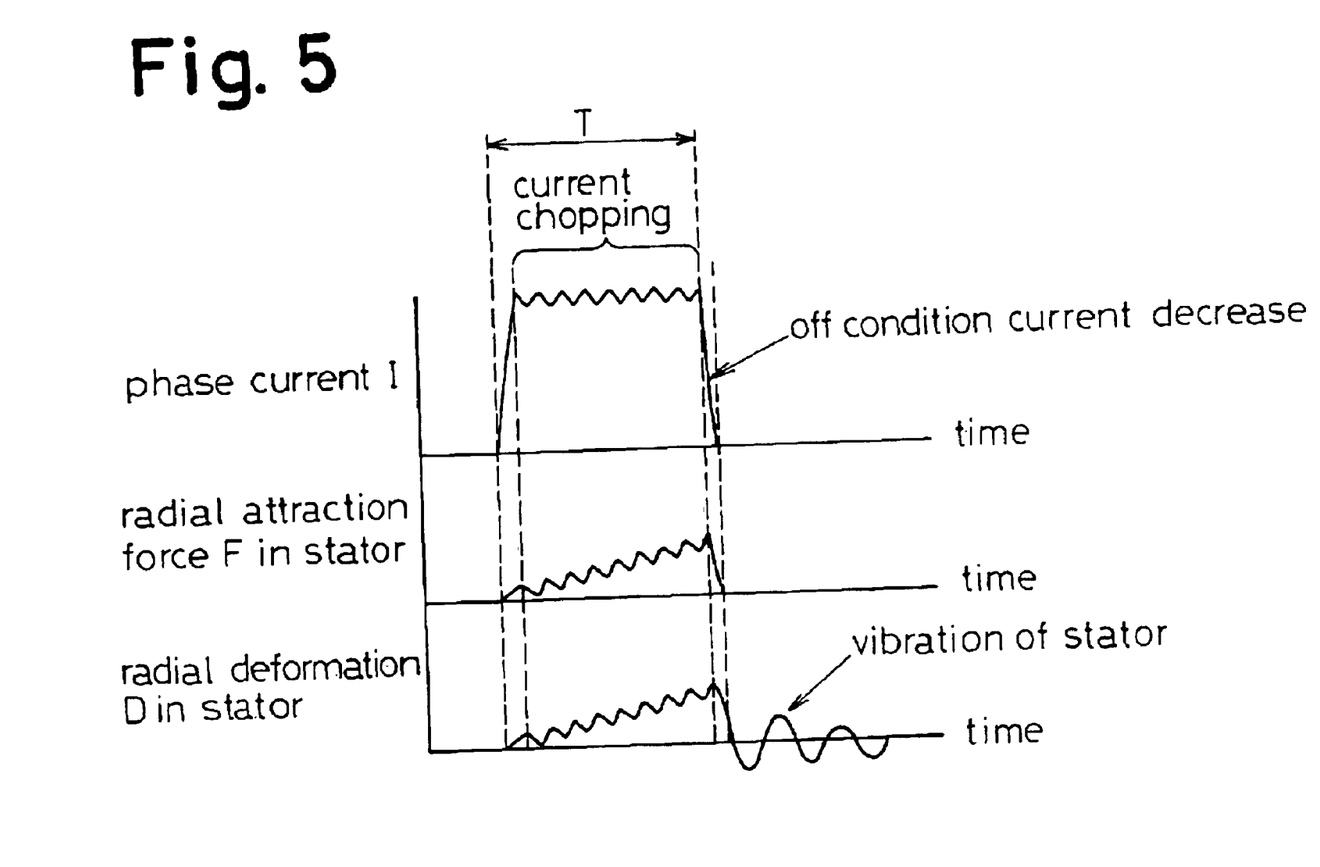
FIG. 5 is a time chart showing a relationship among the phase current, the attracting force between the rotor and the stator and the deformation of the stator.

By the way, when the ON/OFF of the high electric potential side transistor 51 and the low electric potential side transistor 52 are controlled at the control period of each phase, an attracting force F is generated between the rotor pole portions and the stator pole portions in the radial direction. Thereby, the surface of the stator is deformed in the radial direction by the attracting force F. As shown in FIG. 5, in the control period T, the attracting force F is gradually increased after the start of the electric feeding control. As a result, the deformation D of the stator is increased in response to the increase of the attracting force F. Then, when the control period T is ended, namely, when the the high electric potential side transistor 51 and the low electric potential side transistor 52 become OFF condition, the attracting force F disappears suddenly. Thereby, the stator resonates and vibrates freely.

Figure 4:
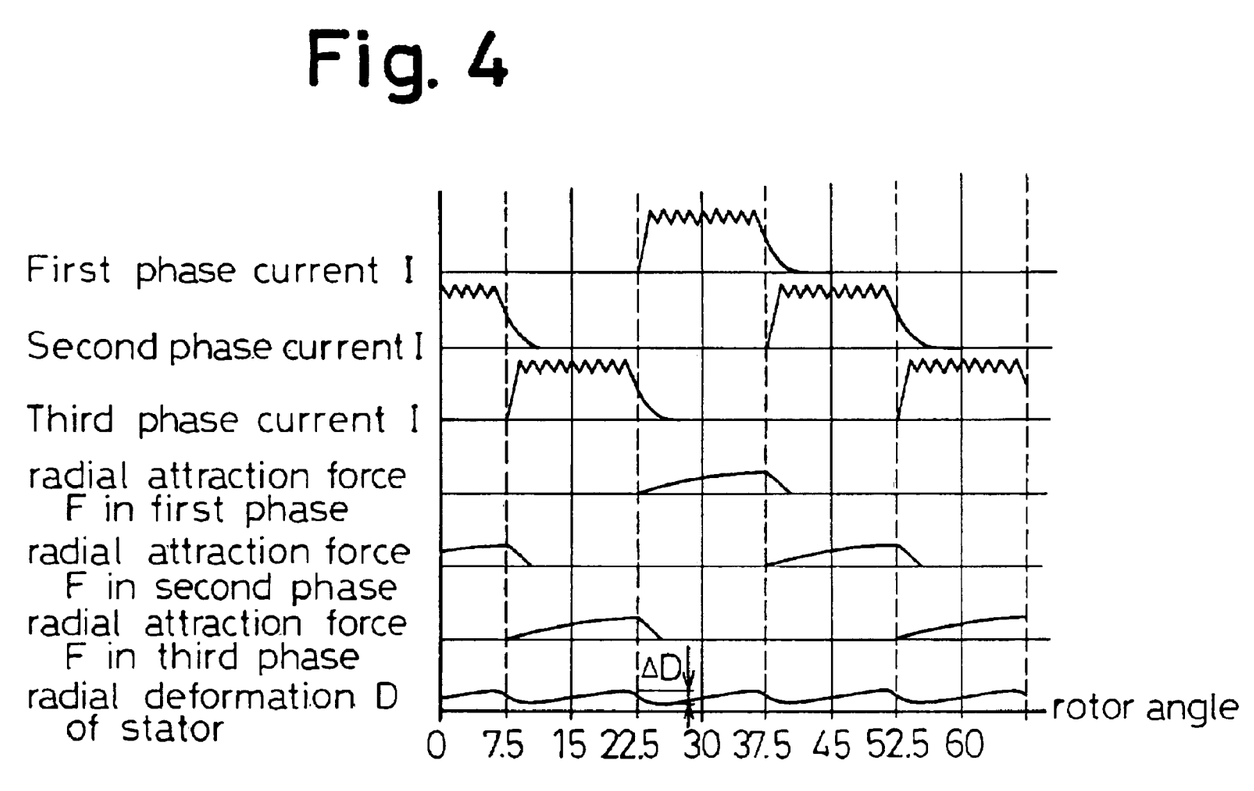
FIG. 4 is a graph showing a relationship among the current waves of each phase coils, attracting forces between the rotor and the stator and the deformations of the stator in a prior device.

The deformation D of the stator generated in the control period T and the vibration of the stator generated just after the end of the control period T are generated in each phases as shown in FIG. 4. The deformation D of the surface of the stator changes largely periodically. The deformation amount ƒ¢D of the deformation D becomes large when the phase is changed and thereby the objectionable acoustic noise is generated.

Driving devices which reduce the objectionable acoustic noise are disclosed in Japanese Patent Application Laid-Open Publications No. 2001-166292 and No. 2001-116183. The driving device disclosed in the Japanese Patent Application Laid-Open Publications No. 2001-166292 decreases the vibration of the stator generated due to the sudden disappear of the attracting force F when the high electric potential side transistor 51 and the low electric potential side transistor 52 become OFF condition. On the other hand, in the driving device disclosed in the Japanese Patent Application Laid-Open Publications No. 2001-116183, an additional vibration which is shifted with a half of cycle with respect to the vibration of the stator generated due to the sudden disappear of the attracting force F is given to the stator and the vibration of the stator is denied.

In the driving device disclosed in the Japanese Patent Application Laid-Open Publications No. 2001-166292, the phase current is slowly decreased when the electric feeding of the phase coils is changed. However, the phase current convergent control period in which the phase current is slowly decreased is long before the phase current reaches the target current. Therefore, although the phase current convergent control period becomes longer when the SR motor rotates under low speed and is able to control, the phase current convergent control period becomes very shorter when the SR motor rotates under high speed and is not able to control. As a result, when the SR motor rotates under high speed, the deformation of the surface of the stator changes largely and periodically and the objectionable acoustic noise is generated.

On the other hand, in the driving device disclosed in the Japanese Patent Application Laid-Open Publications No 2001-116183, as same as the device disclosed in the Japanese Patent Application Laid-Open Publications No. 2001-166292, it is not able to give the additional vibration to the stator and therefore the objectionable acoustic noise is generated. Further, the vibration in the first half cycle of the vibration generated due to the sudden disappear of the attracting force can not be denied when the SR motor rotates under low speed and the objectionable acoustic noise is generated.

SUMMARY OF INVENTION

It is, therefore, an object of the present invention to provide an improved driving control device of a motor which overcomes the above drawbacks.

It is another object of the present invention to provide an improved driving control device of a motor which can decrease the periodical deformation of the surface of the stator when the motor rotates under high speed.

In order to achieve these objectives, according to the present invention, there is provided a driving control device of a motor including a phase current control means for controlling a phase current which is fed to a phase coil of each phases of a motor in a predetermined control period of each phase coils so as to become a predetermined target current, respectively, a convergent control means for converging the phase current after the end of the control period of each phase coils and a driving signal generating means for generating a driving signal which controls the end timing of the phase current convergent control by the convergent control means so that the phase current convergent control is ended between a timing at which a reverse torque is generated by the phase current and the end timing of the control period for next phase coil.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENTS

A driving control device of a motor constituted in accordance with a preferred embodiment of the present invention will be described with reference to attached drawings.

Figure 1:
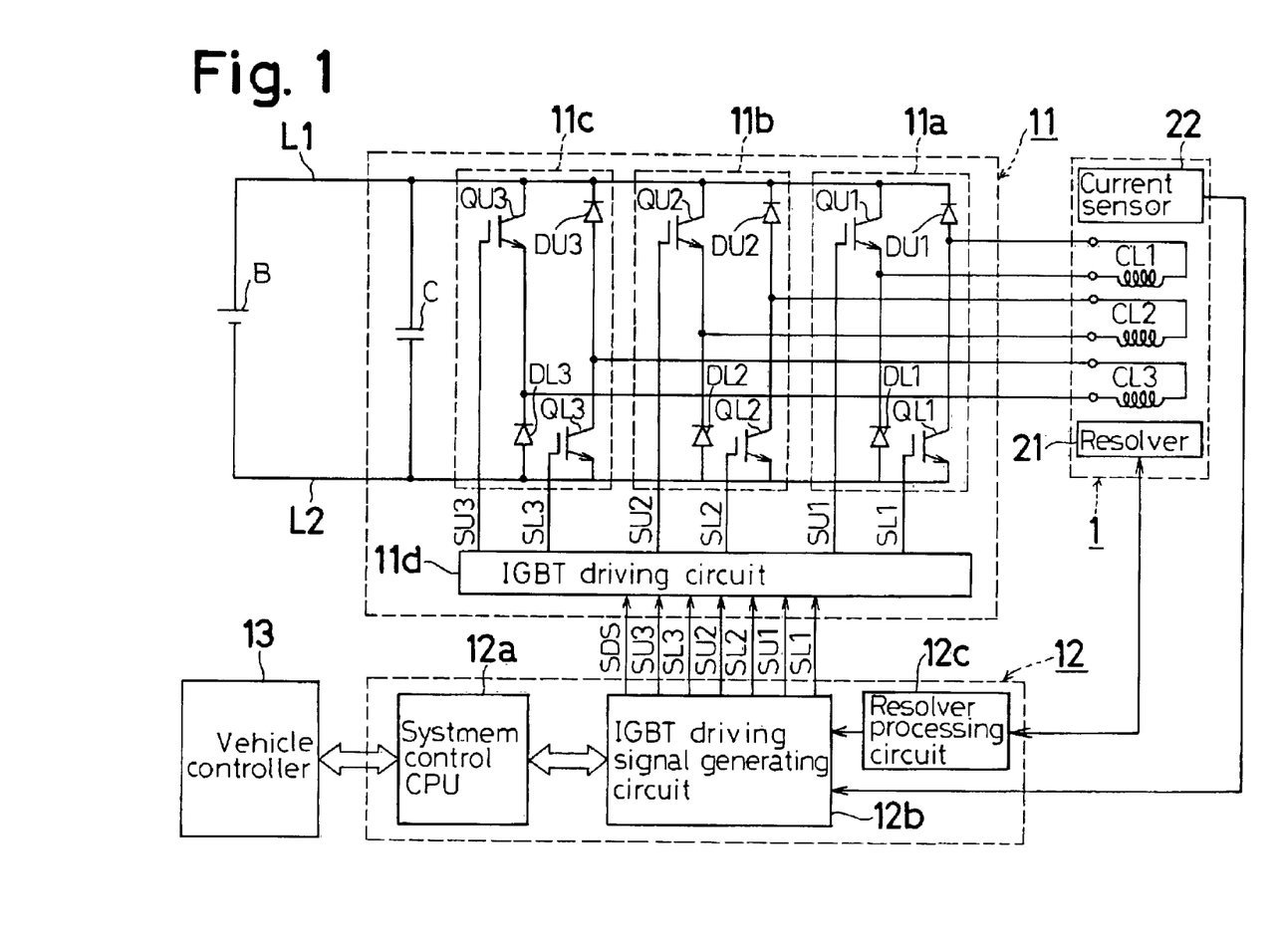
FIG. 1 is a block diagram showing the structure of an embodiment of a driving control device of a motor in accordance with the present invention.
Figure 2:
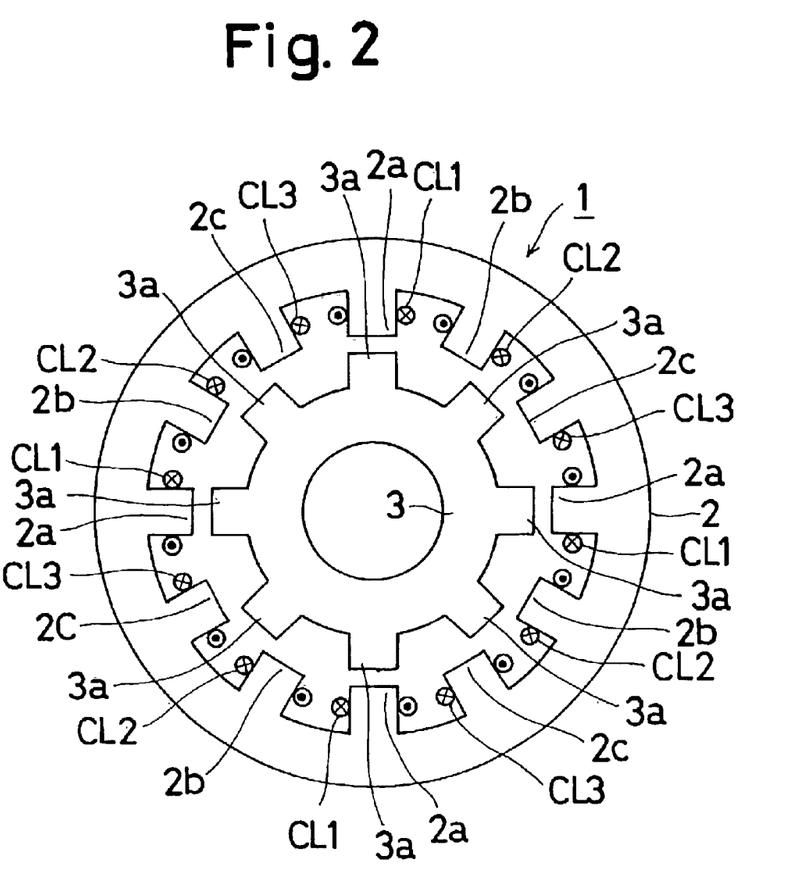
FIG. 2 is a schematic illustration of a switched reluctance motor.

FIG. I shows a block diagram of an electric system which control the driving of the switched reluctance motor (hereinafter, SR motor) 1 as a driving motor of a vehicle. FIG. 2 shows a schematic illustration of the SR motor 1. Referring to FIG. 2, the SR motor 1 has three phases. The SR motor 1 includes a stator 2 having twelve poles which are arranged at intervals with 30 degree and a rotor 3 having eight poles which are arranged at intervals with 45 degree. Namely, twelve poles of the stator 2 is constituted by four first phase poles 2a, four second phase poles 2b and four three phase poles 2c. Each of the first phase poles 2a is disposed at intervals with 90 degree and a first phase coil CL1 is wound on each first phase poles 2a. The first phase coils CL1 which are would on the first phase poles 2a are connected in series. When the first phase coils CL1 are energized, S poles are formed at the top end side of each first phase poles 2a and N poles are formed at the base end side of each first phase poles 2a.

Each of the second phase poles 2b is disposed at intervals with 90 degree and a second phase coil CL2 is wound on each second phase poles 2b. The second phase coils CL2 which are would on the second phase poles 2b are connected in series. When the second phase coils CL2 are energized, S poles are formed at the top end side of each second phase poles 2b and N poles are formed at the base end side of each second phase poles 2b. Each of the third phase poles 2c is disposed at intervals with 90 degree and a third phase coil CL3 is wound on each third phase poles 2c. The third phase coils CL3 which are would on the third phase poles 2c are connected in series. When the third phase coils CL3 are energized, S poles are formed at the top end side of each third phase poles 2c and N poles are formed at the base end side of each third phase poles 2c.

The first, second and third phase coils CL1, CL2, CL3 are energized in a predetermined order at a predetermined period (the control period T) and thereby, the SR motor 1 is rotated under a target driving speed and a target driving torque. For example, when the first, second and third phase coils CL1, CL2, CL3 are energized in order, the rotor 3 is rotated counterclockwise in FIG. 2. Either, when the first, third and second phase coils CL1, CL3, CL2 are energized in order, the rotor 3 is rotated clockwise in FIG. 2.

Next, an electric system which control the driving of the SR motor 1 is described. In FIG. 1, the system includes an inverter circuit 11 which controls feed of electricity to the SR motor 1, a motor electric control unit (hereinafter, ECU) 12 and a vehicle controller 13. The inverter circuit 11 includes a first driving circuit part 11a, a second driving circuit part 11b, a third driving circuit part 11c and an IGBT driving circuit 11d. The first driving circuit part 11a is a switching driving circuit for controlling the feed of electricity to the first phase coil CL1. The second driving circuit part 11b is a switching driving circuit for controlling the feed of electricity to the second phase coil CL2. The third driving circuit part 11c is a switching driving circuit for controlling the feed of electricity to the third phase coil CL3.

The first, second and third switching circuit parts 11a, 11b, 11c include high electric potential side switching transistors QU1, QU2, QU3 (hereinafter, high electric potential side transistor) as high electric potential side switching elements and low electric potential side switching transistors QL1, QL2, QL3 (hereinafter, low electric potential side transistor) as low electric potential side switching elements, respectively. Collector terminals of high electric potential side transistors QU1, QU2, QU3 are connected to a plus electric terminal of a battery B via a high electric potential line L1, respectively. Emitter terminals of the low electric potential side transistor QL1, QL2, QL3 are connected to a minus terminal of the battery B via a low electric potential line L2, respectively. The first phase coil CL1 is connected between the emitter terminal of the high electric potential side transistor QU1 and the collector terminal of the low electric potential side transistor QL1. The second phase coil CL2 is connected between the emitter terminal of the high electric potential side transistor QU2 and the collector terminal of the low electric potential side transistor QL2. The third phase coil CL3 is connected between the emitter terminal of the high electric potential side transistor QU3 and the collector terminal of the low electric potential side transistor QL3.

The first, second and third switching circuit parts 11a, 11b, 11c include first, second and third high electric potential side flywheel diodes (hereinafter, high electric potential side diodes) DU1, DU2, DU3 and first, second and third low electric potential side diodes (hereinafter, low electric potential side diodes) DL1, DL2, DL3. The first, second and third high electric potential side diodes DU1, DU2, DU3 are connected between the high electric potential line L1 and the collector terminals of the first, second and third low electric potential side transistors QL1, QL2, QL3, respectively. The first, second and third low electric potential side diodes DL1, DL2, DL3 are connected between the low electric potential line L2 and the emitter terminals of the first, second and third high electric potential side transistors QU1, QU2, QU3, respectively. Further, a condenser C is connected between the high and low electric potential lines L1 and L2.

In this embodiment, the first, second and third high electric potential side transistors QU1, QU2, QU3 and the first, second and third low electric potential side diodes DL1, DL2, DL3 are constituted by a power transistor which is an insulated gate bipolar transistor (IGBT), respectively. ON/OFF of the high electric potential side transistors QUI, QU2, QU3 are controlled base on first, second and third high electric potential side driving signals SU1, SU2, SU3 which are fed to their gate terminals, respectively. When the first, second and third high electric potential side driving signals SU1, SU2, SU3 are H level (high electric potential), the high electric potential side transistors QU1, QU2, QU3 become ON, respectively. When the first, second and third high electric potential side driving signals SU1, SU2, SU3 are L level (low electric potential), the high electric potential side transistors QU1, QU2, QU3 become OFF, respectively. On the other hand, ON/OFF of the low electric potential side transistors QL1, QL2, QL3 are controlled base on first, second and third low electric potential side driving signals SL1, SL2, SL3 which are fed to their gate terminals, respectively. When the first, second and third low electric potential side driving signals SL1, SL2, SL3 are H level (high electric potential), the low electric potential side transistors QU1, QU2, QU3 become ON, respectively. When the first, second and third low electric potential side driving signals SL1, SL2, SL3 are L level (low electric potential), the low electric potential side transistors QL1, QL2, QL3 become OFF, respectively.

In detail, in the first driving circuit part 11a, when ON/OFF condition of the first high electric potential side transistor QU1 and the first low electric potential side transistor QL1 is controlled, the feeding the electricity to the first phase coil CL1 is controlled. In the second driving circuit part 11b, when ON/OFF condition of the second high electric potential side transistor QU2 and the second low electric potential side transistor QL2 is controlled, the feeding the electricity to the second phase coil CL2 is; controlled. In the third driving circuit part 11c, when ON/OFF condition of the third high electric potential side transistor QU3 and the third low electric potential side transistor QL3 is controlled, the feeding the electricity to the third phase coil CL3 is controlled.

The first, second and third high electric potential side driving signals SU1, SU2, SU3 and the first, second and third low electric potential side driving signals SL1, SL2, SL3 are outputted from an IGBT driving circuit 11d. The IGBT driving circuit 11d is a signal output circuit. The first, second and third high electric potential side driving signals SU1, SU2, SU3 and the first, second and third low electric potential side driving signals SL1, SL2, SL3 which are generated by the ECU 12 are fed to the IGBT driving circuit 11d and the IGBT driving circuit 11d outputs these signals SU1, SU2, SU3, SL1, SL2, SL3 to the gate terminals of the corresponding transistor QU1, QU2, QU3, QL1, QL2, QL3. Further, when a shut down signal SDS which is generated by the ECU 12 is fed to the IGBT driving circuit 11d, the IGBT driving circuit 11d outputs OFF signals to the gate terminals of all of the transistors QU1, QU2, QU3, QL1, QL2, QL3 for making all of the transistors QU1, QU2, QU3, QL1, QL2, QL3 be OFF condition.

The ECU 12 includes a system control CPU 12a, an IGBT driving signal generating circuit 12b and a resolver processing circuit 12c. The system control CPU 12a is connected to the vehicle controller 13 and receives information regarding the driving condition of the vehicle from the vehicle controller 13. The system control CPU 12a calculates a target driving speed and a target driving torque of the SR motor 1 on the basis of the information regarding the driving condition of the vehicle. In this embodiment, the target driving speed and the target driving torque are obtained from map data of target driving speed and target driving torque with respect to the driving condition which is made preparations in advance. The map data is memorized in a memory which is built in the system control CPU 12a.

The system control CPU 12a calculates order of electricity feeding to each phase coils CL1, CL2, CL3, a control period T and a target current value on the basis of the target driving speed and the target driving torque after the calculation the target driving speed and the target driving torque. In this embodiment, the order, the control period T (the angle of the rotor 3) and the target current value are obtained from map data of the order, the control period T and the target current value with respect to the target driving speed and the target driving torque which is made preparations in advance. The map data is memorized in a memory which is built in the system control CPU 12a.

Further, the system control CPU 12a calculates a convergent current value Is for a phase current convergent control after the end of the control period T. In this embodiment, the convergent current value Is is obtained from map data of the convergent current value with respect to the angle of the rotor 3 which is made preparations in advance. The map data is memorized in a memory which is built in the system control CPU 12a.

The system control CPU 12a is connected to the IGBT driving signal generating circuit 12b and outputs the data of the order of electricity feeding to each phase coils, the control period T and the target current value to the IGBT driving signal generating circuit 12b. The IGBT driving signal generating circuit 12b is connected to a resolver 21 as a first detecting means provided on the SR motor 1 via the resolver processing circuit 12c. The resolver 21 is a sensor for detecting a rotational angle (absolute angle) of the SR motor 1 (the rotor 3) and the detected signal of the resolver 21 is fed to the IGBT driving signal generating circuit 12b via the resolver processing circuit 12c. The resolver processing circuit 12c inspects the rotational angle (absolute angle) of the SR motor 1 at times on the basis of the detected signal from the resolver 21. Further, the IGBT driving signal generating circuit 12b is connected to a current sensor 22 as a second detecting means provided on the SR motor 1. The current sensor 22 detects the current value which passes each phase coils CL1, CL2, CL3 and outputs the detected signal to the IGBT driving signal generating circuit 12b. The IGBT driving signal generating circuit 12b inspects the current value passing each phase coils CL1, CL2, CL3 on the basis of the detected signal from the current sensor 22.

The IGBT driving signal generating circuit 12b receives the date of the order of electricity feeding to each phase coils, the control period T and the target current value from the system control CPU 12a, the data of rotational angle (absolute angle) of the SR motor 1 from the resolver 21 and the date of the current value passing each phase coils CL1, CL2, CL3 from the current sensor 22 and generates signals for controlling the feeding of the electricity to each phase coils CL1, CL2, CL3. Namely, the IGBT driving signal generating circuit generates the first, second and third high electric potential side driving signals SU1, SU2, SU3 for controlling ON/OFF condition of the high electric potential side transistors QU1, QU2, QU3 at the predetermined control period, respectively. Further, the IGBT driving signal generating circuit generates the first, second and third low electric potential side driving signals SL1, SL2, SL3 for controlling ON/OFF condition of the low electric potential side transistors QL1, QL2, QL3 at the predetermined control period, respectively.

In detail, the timing for beginning to control the feeding of the electricity to one of the first, second and third phase coils CL1, CL2, CL3 is determined on the basis of the angle (absolute angle) of the rotor 3. At the same time as the beginning to control the feeding of the electricity, the corresponding high electric potential side transistors QU1, QU2, QU3 and the corresponding low electric potential side transistors QL1, QL2, QL3 are turned ON and the phase current I is passed one of the phase coils CL1, CL2, CL3. When the value of the phase current I passing one of the phase coils CL1, CL2, CL3 reaches the target current value calculated by the system control CPU 12b, the IGBT driving signal generating circuit 12b controls the ON/OFF condition of the corresponding high electric potential side transistors QU1, QU2, QU3 and the corresponding low electric potential side transistors QL1, QL2, QL3 in the control period T so that the phase current I is maintained to the target current value.

When the timing for ending to control the feeding of the electricity to one of the first, second and third phase coils CL1, CL2, CL3 in the control period T is determined on the basis of the angle (absolute angle) of the rotor 3, the control of the feeding of the electricity to the other one of the phase coils CL1, CL2, CL3 is begun.

Figure 3:
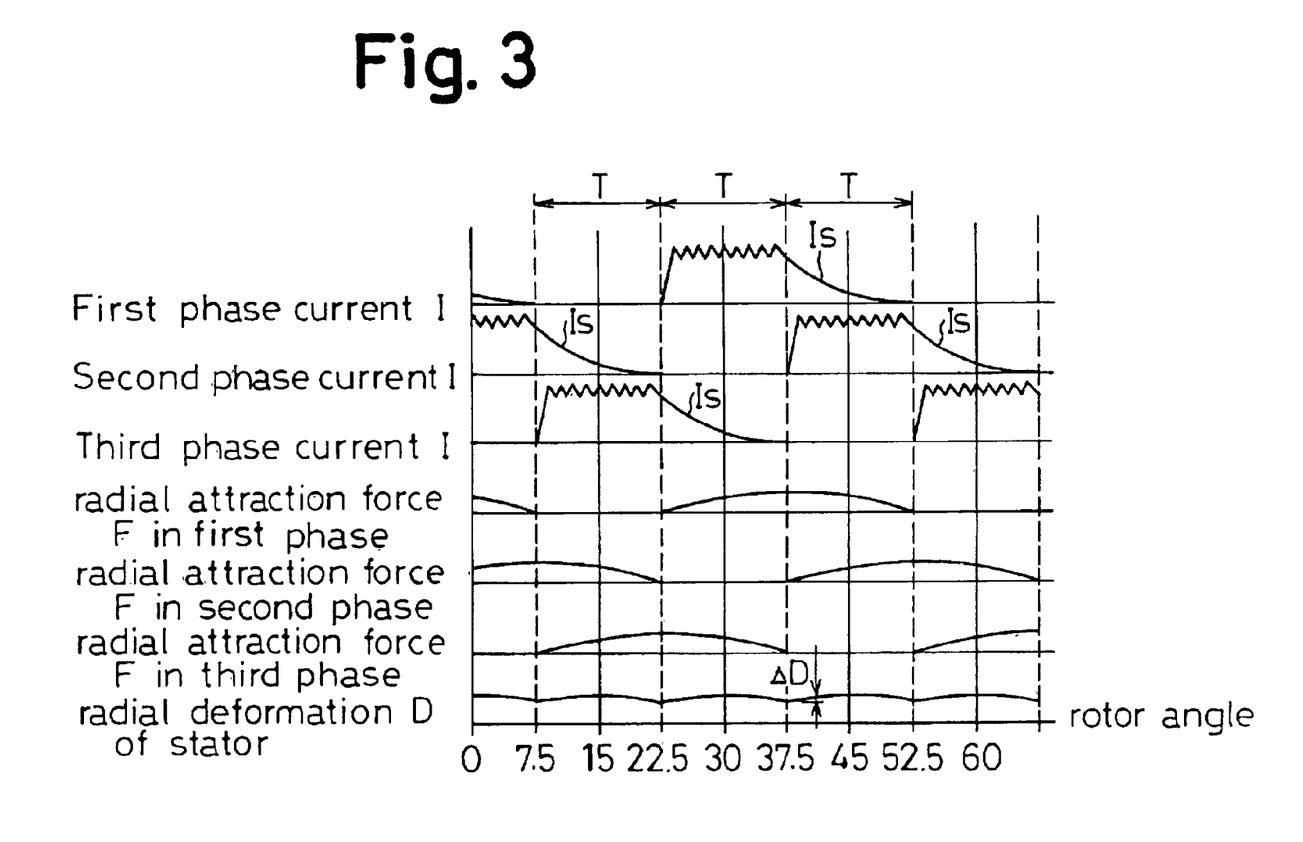
FIG. 3 is a graph showing a relationship among the current waves of each phase coils, attracting forces between the rotor and the stator and the deformations of the stator in accordance with the embodiment of the present invention.

In this embodiment, as shown in FIG. 3, when the rotor 3 is rotated counterclockwise with 7.5 degree from the condition shown in FIG. 2, the control of the feeding of the electricity to the third phase coil CL3 is begun. When the rotor 3 is rotated counterclockwise with 22.5 degree from the condition shown in FIG. 2, the control of the feeding of the electricity to the third phase coil CL3 is ended. At the same time as the control of the feeding of the electricity to the third phase coil CL3 is ended, the control of the feeding of the electricity to the first phase coil CL1 is begun. When the rotor 3 is rotated counterclockwise with 15 degree from the beginning (i.e. when the rotor 3 is rotated counterclockwise with 37.5 degree from the condition shown in FIG. 2), the control of the feeding of the electricity to the first phase coil CL1 is ended. At the same time as the control of the feeding of the electricity to the first phase coil CL1 is ended, the control of the feeding of the electricity to the second phase coil CL2 is begun. When the rotor 3 is rotated counterclockwise with 15 degree from the beginning (i.e. when the rotor 3 is rotated counterclockwise with 52.5 degree from the condition shown in FIG. 2), the control of the feeding of the electricity to the second phase coil CL2 is ended.

Namely, the control of the feeding of the electricity to the first, second and third phase coils CL1, CL2, CL3 is changed in order every when the rotor 3 is rotated with 15 degree. While the rotor 3 is rotated with 15 degree, namely, during the control period T, the feeding of the electricity to the first, second and third phase coils CL1, CL2, CL3 is controlled so that the phase current becomes the target current. Accordingly, as shown in FIG. 3, the attracting force F operating on the poles 2a of the stator 2 of each phase is gradually increased from zero by the control of the feeding of the electricity in the control period T. Further, when the control of the feeding of the electricity to one of the phase coils CL1, CL2, CL3 is ended, the IGBT driving signal generating circuit 12b performs the phase current convergent control for one of the phase coils CL1, CL2, CL3.

Next, the phase current convergent control by the IGBT driving signal generating circuit 12b is described. According to the phase current convergent control, when the control of the feeding of the electricity to one of the phase coils CL1, CL2, CL3 is ended, the corresponding high electric potential side transistors QU1, QU2, QU3 and the corresponding low electric potential side transistors QL1, QL2, QL3 are not turned OFF and the phase current I is slowly and gradually converged. In this embodiment, the period for converging control is a period from the timing for ending to control the feeding of the electricity to one of the phase coils to the timing for ending to control the feeding of the electricity to the other one of the phase coils which is next controlled. Namely, the period for converging control is equal to the control period T.

In detail, as shown in FIG. 3, when the rotor 3 is rotated counterclockwise with 22.5 degree, the control of the feeding of the electricity to the third phase coil CL3 is ended and the control of the feeding of the electricity to first phase coil CL1 is begun. At this time, the phase current convergent control for the third phase coil CL3 is performed side by side with the control of the feeding of the electricity to the first phase coil CL1. Next, when the control of the feeding of the electricity to the first phase coil CL1 is ended, the control of the feeding of the electricity to second phase coil CL2 is begun. At this time, the phase current convergent control for the first phase coil CL1 is performed side by side with the control of the feeding of the electricity to the second phase coil CL2. Further, when the control of the feeding of the electricity to the second phase coil CL2 is ended, the control of the feeding of the electricity to third phase coil CL3 is begun. At this time, the phase current convergent control for the second phase coil CL2 is performed side by side with the control of the feeding of the electricity to the third phase coil CL3.

In the phase current convergent control for each phase coils CL1, CL2, CL3, the convergent degree (the convergent current value Is) of the phase current I is controlled by map data of the convergent current value Is with respect to the angle of the rotor 3 which is memorized in the memory built in the system control CPU 12a. In detail, as shown in FIG. 3, the convergent current value Is of the phase current I is attenuated and disappears. As clearly shown in FIG. 3, the convergent current value Is converges to a quarter of the target current value at the middle point of the period for converging control and becomes zero at the timing for ending the period for converging control. The middle point of the period for converging control corresponds to the timing (the angle of the rotor) at which the poles 2a, 2b, 2c of the stator 2 performed the convergent control is aligned to the corresponding poles 3a of the rotor 3. In FIG. 3, the middle points of the period for converging control for the first phase coil CL1 are 0 degree and 45 degree, the middle points of the period for converging control for the second phase coil CL2 are 15 degree and 60 degree, the middle point of the period for converging control for the third phase coil CL3 is 30 degree.

Accordingly, when the rotor 3 is further rotated after the poles 2a, 2b, 2c of the stator 2 are aligned to the poles 3a of the rotor 3 at the middle point of the period for converging control for the phase coil, a reverse torque is generated by the attracting force between the poles 2a, 2b, 2c and the poles 3a. However, although the reverse torque is in proportion to the phase current I, since the convergent current value Is converges to a quarter of the target current value at the middle point of the period for converging control, the reverse torque becomes very smaller.

On the other hand, even if the phase current I (the convergent current value Is) is small, since the distance between the poles 2a, 2b, 2c and the poles 3a is short, the radial attracting force operating after the middle point becomes larger. As a result, the attracting force operates in the radial direction after the middle point. Accordingly, as shown in FIG. 3, the attracting force operating the poles 2a of the stator 2 is slowly and gradually decreased from the attracting force F which is generated just after the control period.

The vehicle controller 13 gets hold of the driving condition of the vehicle and generates and outputs information for various control. The vehicle controller 13 receives signals from shift lever operational position detecting device, the brake switch, the accelerator switch, accelerator opening amount sensor and so on and outputs the driving condition information to the system control CPU 12a.

Next, the operation of the driving control device is described as follows. The system control CPU 12a calculates the target driving speed and the target driving torque on the basis of the driving condition information from the vehicle controller 13. Then, the system control CPU 12a calculates the order of electricity feeding to each phase coils CL1, CL2, CL3, the control period T and the target current value and outputs them to the IGBT driving signal generating circuit 12b. The IGBT driving signal generating circuit 12b generates the high electric potential side driving signals SU1, SU2, SU3 and the low electric potential side driving signals SL1, SL2, SL3 on the basis of the order of electricity feeding to each phase coils CL1, CL2, CL3, the control period T, the target current value, the rotational angle (absolute angle) of the SR motor 1 and the current value passing the phase coils CL1, CL2, CL3 from the current sensor 22 and feeds these driving signals to the driving circuit parts of the inverter circuit 11 so that the phase current is close to the target current value by the chopping control.

Accordingly, the phase current I passing each phase coils CL1, CL2, CL3 is controlled to the target current value in the control period T and the rotation of the rotor 3 is controlled. On the other hand, the phase current convergent control is performed to each phase coil CL1, CL2, CL3 after the control period. The IGBT driving signal generating circuit 12b generates the high electric potential side driving signals SU1, SU2, SU3 and the low electric potential side driving signals SL1, SL2, SL3 on the basis of the map data of the convergent current value Is so that the phase current becomes the convergent current value Is. Accordingly, the phase current I of each phase coils converges in accordance with the convergent current value Is and is disappeared.

Accordingly, the attracting force operating the poles 2a of the stator 2 by the phase current convergent control is combined with the attracting force generated by the control of the feeding the electricity to the phase coils and the variation of the combined attracting force becomes smaller. As a result, as shown in FIG. 3, the attracting force whose variation is small is constantly operated to the stator 2 of the SR motor 1 and the deformation amount $f\phi D$ due to the attracting force becomes smaller. Therefore, it is able to reduce the objectionable acoustic noise.

Further, the period for converging control is equal to the control period T. Namely, the phase current convergent control is performed using relative long period. Therefore, even if the SR motor 1 is rotated under high speed, it is able to perform the phase current convergent control while following the high speed rotation of the SR motor 1.

In this embodiment, it is able to change the timing for ending the period for converging control. For example, the timing for ending the period for converging control may be changed between the point passing the middle point and the timing for ending the control of feeding the electricity to the next phase coil. Further, it is able to change the degree of the converging current value Is with respect to the target current value within the range in which the large influence is given to the rotation of the motor. Further, the converging current value Is can be obtained by the convergent of the phase current I based on a predetermined duty ratio. The wave form of the converging current value Is is not limited to the wave form shown in FIG. 3. For example, the following phase current convergent control is also possible. The phase current is controlled by duty control until the middle point and then the high electric potential side transistors QU1, QU2, QU3 and the low electric potential side transistors QL1, QL2, QL3 are turned OFF. Then the phase current I is disappeared naturally. Further, the present invention can be also applied to a motor which is used with the exception of vehicle.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A driving control device of a motor comprising:
   a phase current control means for controlling a phase current which is fed to a phase coil of each phases of a motor in a predetermined control period of each phase coils so as to become a predetermined target current, respectively,
   a convergent control means for converging the phase current after the end of the control period of each phase coils and
   a driving signal generating means for generating a driving signal which controls the end timing of the phase current convergent control by the convergent control means so that the phase current convergent control is ended between a timing at which a reverse torque is generated by the phase current and the end timing of the control period for next phase coil.

2. A driving control device of a motor as recited in claim 1 further comprising a first detecting means for detecting the rotational angle of the motor, wherein the driving signal generating circuit detects the end timing of the phase current convergent control set between the timing at which the reverse torque is generated and the end timing of the control period for next phase coil and generates the driving signal for generating a converging phase current before the end timing of the phase current convergent control is reached.

3. A driving control device of a motor as recited in claim 1 further comprising a first detecting means for detecting the rotational angle of the motor, a second detecting means for detecting a current value passing each phase coils and a memory means for memorizing a convergent current value of the phase current in a period for phase current convergent control, wherein the driving signal generating means compares the value of the phase coil with the convergent current value on the basis of the first and second detecting means and generates the driving signal which converges the phase current on the basis of the convergent current value.

* * * * *